US008510750B2

(12) United States Patent
Rodgers et al.

(10) Patent No.: US 8,510,750 B2
(45) Date of Patent: Aug. 13, 2013

(54) METHOD FOR CACHING RESOURCE REPRESENTATIONS IN A CONTEXTUAL ADDRESS SPACE

(75) Inventors: Peter James Rodgers, Wotton-under-Edge (GB); Antony Allan Butterfield, Sutton Benger (GB)

(73) Assignee: 1060 Research Limited (GB)

(*) Notice: Subject to any disclaimer, the term of this patent is extended or adjusted under 35 U.S.C. 154(b) by 995 days.

(21) Appl. No.: 12/564,828

(22) Filed: Sep. 22, 2009

(65) Prior Publication Data

US 2010/0095066 A1   Apr. 15, 2010

Related U.S. Application Data

(60) Provisional application No. 61/099,519, filed on Sep. 23, 2008.

(51) Int. Cl.
  *G06F 3/00* (2006.01)
  *G06F 13/00* (2006.01)
  *G06F 9/26* (2006.01)

(52) U.S. Cl.
  USPC ............... 719/313; 711/118; 711/209

(58) Field of Classification Search
  None
  See application file for complete search history.

(56) References Cited

U.S. PATENT DOCUMENTS 5,732,405 A * 3/1998 Ho et al. .................... 711/209
6,163,812 A * 12/2000 Gopal et al. ............... 719/310
7,334,107 B2 * 2/2008 Schoinas et al. ........... 711/118
7,748,009 B2 * 6/2010 Talluri et al. ............... 719/313
2006/0031567 A1 * 2/2006 Aoki et al. .................. 709/235

FOREIGN PATENT DOCUMENTS

WO   WO2008032070   3/2008

OTHER PUBLICATIONS

"Content Delivery Networks: Status and Trends", Vakali, 2003, pp. 1-7.*
"Guaranteeing Hits to Improve the Efficiency of a Small Instruction Cache", Hines, 2007, pp. 1-12.*
"Uniform Resource Identifier URI: Generic Syntax", Network Working Group, 2005, pp. 1-62.*
International Search Report and Written Opinion dated Apr. 12, 2009.

* cited by examiner

*Primary Examiner* — Tuan Dao
(74) *Attorney, Agent, or Firm* — Dale F. Regelman; Quarles & Brady LLP

(57) ABSTRACT

A method to generate and save a resource representation recited by a request encoded in a computer algorithm, wherein the method receives from a requesting algorithm an Unresolved resource request. The method resolves the resource request to an endpoint and evaluates the resolved resource request by the endpoint to generate a resource representation. The method further generates and saves in a cache at least one Unresolved request scope key, a resolved request scope key, and a cache entry comprising the resource representation. The method associates the cache entry with the resolved request scope key and with the at least one Unresolved request scope key using a mapping function encoded in the cache.

66 Claims, 7 Drawing Sheets

Kernel Interaction

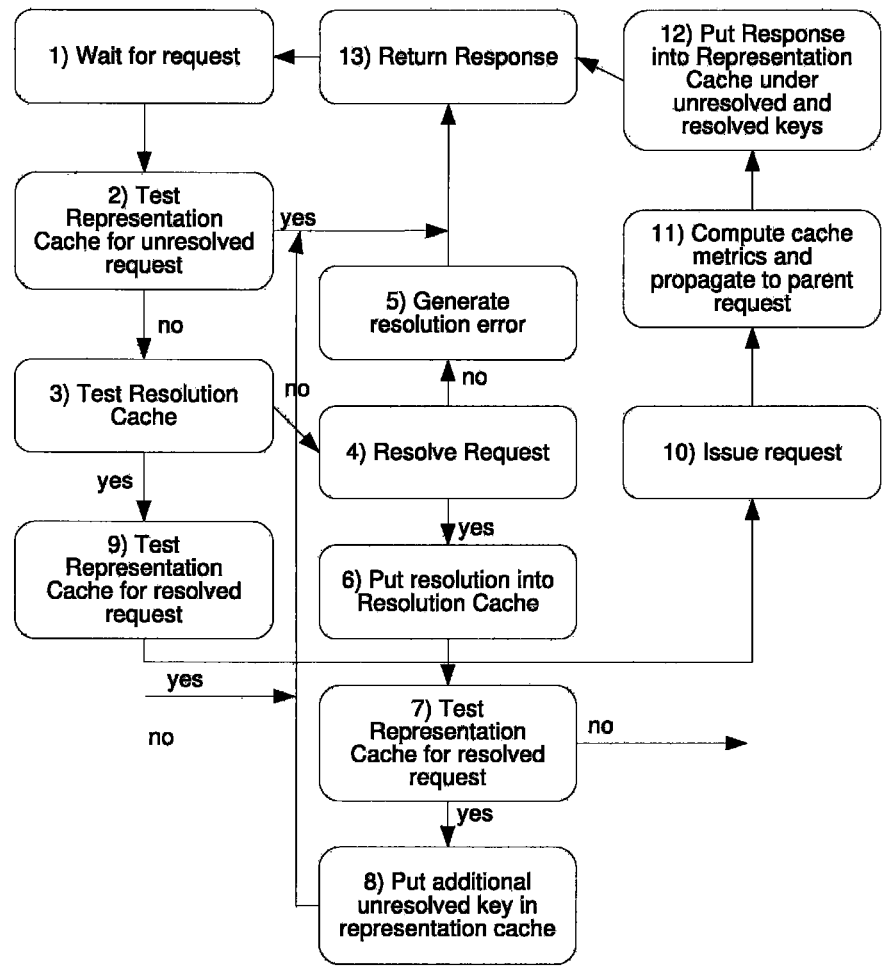
Fig 4. Kernel Interaction

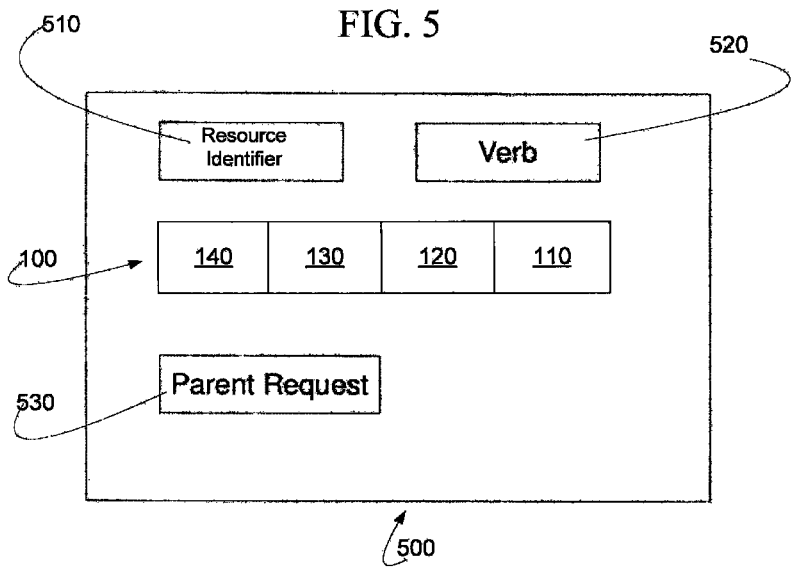
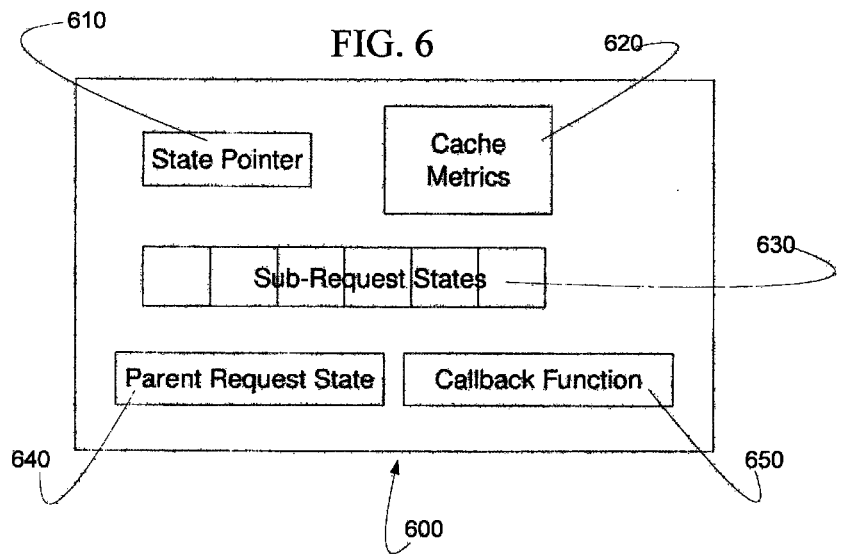

METHOD FOR CACHING RESOURCE REPRESENTATIONS IN A CONTEXTUAL ADDRESS SPACE

CROSS REFERENCE TO RELATED APPLICATIONS

This Application claims priority from a U.S. Provisional Application having Ser. No. 61/099,519 filed Sep. 23, 2008, which is hereby incorporated herein by reference.

FIELD OF THE INVENTION

This invention relates to a method for caching resource representations computed in a dynamic contextual multivalent resource address space.

BACKGROUND OF THE INVENTION

It is a long established practice of computation that looking up a computational value from a set of pre-computed values is more efficient and less error prone than performing the computation algorithm directly. Often the computational cost of lookup for a stored value is cheap, typically constant to logarithmic in time, whereas direct computation is rarely as efficient and typically is linear or worse. A clear demonstration of this simple model for efficient computation was given by Napier with the publication in 1619 of the first table of logarithms in Mirifici logarithmorum canonis constructio.

SUMMARY OF THE INVENTION

A method is presented to generate and save a resource representation recited by a request encoded in a computer algorithm. The method receives from a requesting algorithm an Unresolved resource request, wherein that Unresolved resource request is associated with a first context, and wherein that first context comprises a first address space, and wherein the Unresolved resource request comprises an Unresolved request scope comprising at least the first context.

The method resolves the resource request to an endpoint, wherein that endpoint is associated with a second context, wherein the second context comprises a second address space. The method then evaluates the resolved resource request by the endpoint to generate a resource representation.

The method generates and saves in a cache at least one Unresolved request scope key, a resolved request scope key, and a cache entry comprising the resource representation. The method associates the cache entry with the resolved request scope key and with the at least one Unresolved request scope key using a mapping function encoded in the cache.

An article of manufacture comprising a programmable processor and at least one computer readable medium comprising computer readable program code encoded therein to generate and save a resource representation is presented. The computer readable program code comprising a series of computer readable program steps to effect receiving from a requesting algorithm an Unresolved resource request, wherein that Unresolved resource request is associated with a first context, wherein the first context comprises a first address space, and wherein the Unresolved resource request comprises an Unresolved request scope comprising at least the first context.

The computer readable program code further comprising a series of computer readable program steps to effect resolving the resource request to an endpoint, wherein that endpoint is associated with a second context, wherein the second context comprises a second address space. The computer readable program code further comprising a series of computer readable program steps to effect evaluating the resolved resource request by the endpoint to generate a resource representation, generating and saving in a cache at least one Unresolved request scope key, generating and saving in the cache a resolved request scope key, generating and saving in the cache a cache entry comprising the resource representation, and associating the cache entry with the resolved request scope key and with the at least one Unresolved request scope key using a mapping function encoded in the cache.

A computer program product encoded in a computer readable medium and useable with a programmable processor to generate and save a resource representation is presented. The computer program product comprises computer readable program code which causes the programmable processor to receive from a requesting algorithm an Unresolved resource request, wherein that Unresolved resource request is associated with a first context, wherein the first context comprises a first address space, and wherein the Unresolved resource request comprises an Unresolved request scope comprising at least the first context.

The computer program product further comprises computer readable program code which causes the programmable processor to resolve the resource request to an endpoint, wherein that endpoint is associated with a second context, wherein the second context comprises a second address space. The computer program product comprises computer readable program code which causes the programmable processor to evaluate the resolved resource request by the endpoint to generate a resource representation.

The computer program product comprises computer readable program code which causes the programmable processor to generate and save in a cache at least one Unresolved request scope key, to generate and save in the cache a resolved request scope key, to generate and save in the cache a cache entry comprising the resource representation, and to associate the cache entry with the resolved request scope key and with the at least one Unresolved request scope key using a mapping function encoded in the cache.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a flowchart summarizes the steps of Applicants' method as implemented by Applicants' resource oriented computing algorithm;

FIG. 5 illustrates one embodiment of Applicants' resource request;

FIG. 6 illustrates one embodiment of Applicants' Request-State information structure;

DETAILED DESCRIPTION OF THE PREFERRED EMBODIMENTS

Figure 1A:
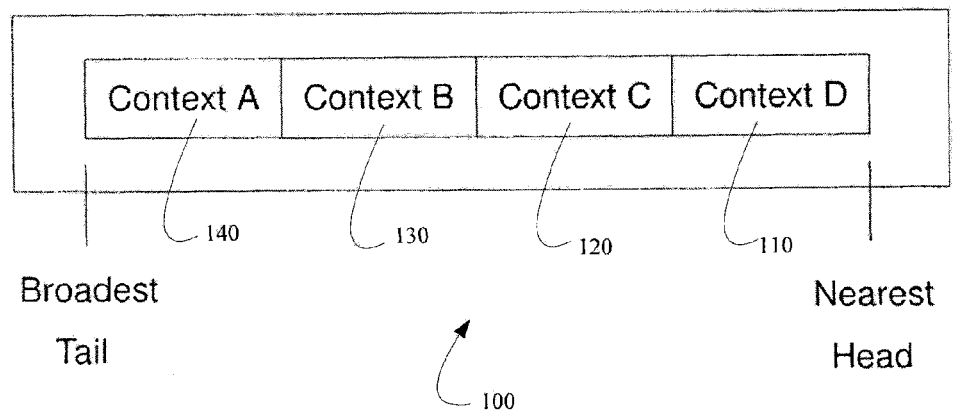
FIG. 1A illustrates a context scope comprising four contexts.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A schematic flow chart diagram included is generally set forth as logical flow-chart diagram (e.g., FIG. 4). As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method (e.g., FIG. 4). Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

A Resource is an abstract entity modeled in a resource oriented system.

A Request comprises an information structure containing Resource-Identifier, Verb, Request Scope, Representation-Type and Parent-Request.

A Context is a Resource Identifier address space. It can resolve a request to one of its enclosed Endpoints or nested Contexts. In certain embodiments, the context address space is embodied in a computer readable medium.

An Endpoint is a software service residing within a context which can handle a request and respond with a Response.

A Representation comprises an information structure encapsulating a snapshot of the state of a resource. A Representation has a Representation-Type.

A Request Scope comprises an information structure containing an ordered list of one or more Contexts (FIG. 1). The list starts with the broadest scope and continues to the nearest scope. Typically a Request Scope comprises a linked list where the tail of the list is the broadest and the head of the list the nearest.

Applicants' Resource Oriented Computing ("ROC") method and algorithm is described and claimed in a U.S. application Ser. No. 11/855,066 (hereinafter the '066 Application), and assigned to the common assignee hereof. That U.S. application Ser. No. 11/855,066 is hereby incorporated herein by reference.

In general, Applicants' contextual resource oriented computing method attempts to resolve a request to an Endpoint using a Request Scope, such as request scope 100 (FIGS. 1A, 1B, 1C, 5), wherein that request scope is recited in a resource request, such as resource request 500 (FIG. 5). Referring now to FIG. 1A, the order of resolution begins at a nearest context. In the illustrated embodiment of FIG. 1A, Context D 110 comprises a nearest context.

Figure 1B:
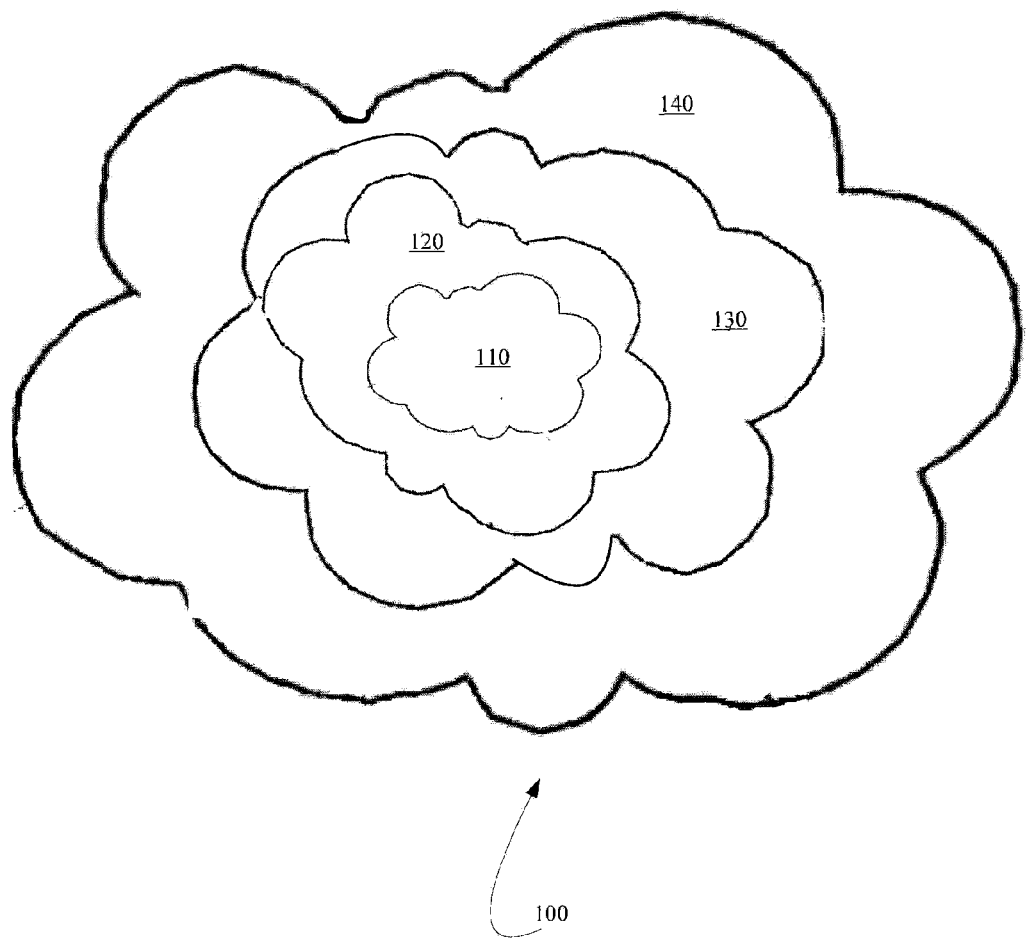
FIG. 1B illustrates a context scope comprising four nested contexts.
Figure 1C:
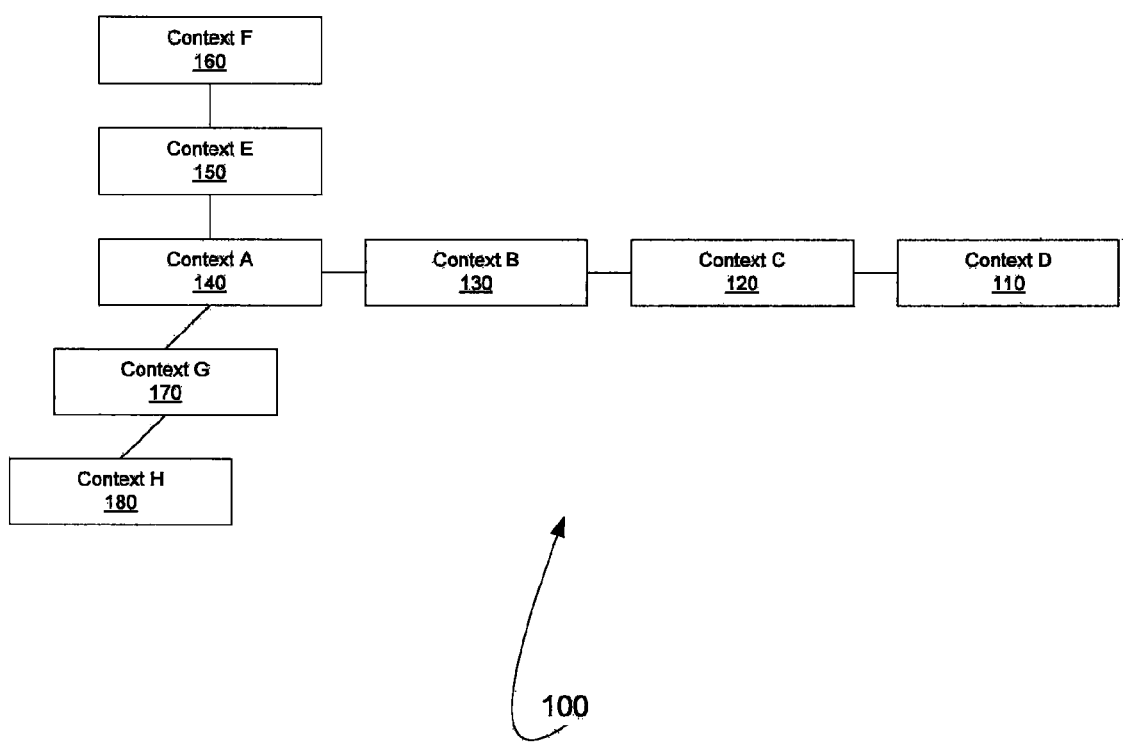
FIG. 1C illustrates a multi-dimensional context scope comprising three dimensions and eight contexts.

Referring now to FIG. 1B, in certain embodiments the context scope comprises a listing of nested contexts, wherein Context A 140 comprises a broadest, address space. Applicants method may increase the scope, by delegating to other contexts, or reduce the context scope. If during the process the resolved scope is reduced all the way out to the broadest Context A and there is still no resolution, then the request cannot be resolved in the Request Scope.

In certain embodiments, context scope 100 comprises a (N)-dimensional context scope, wherein (N) is greater than 1. In the illustrated embodiment of FIG. 1C, context scope 100 comprises a three-dimensional context scope, wherein Contexts A, B, C, D, define a first context dimension, and wherein Contexts E and F define a second context dimension, and wherein Contexts G and H define a third context dimension.

A Response comprises an information structure containing at least a Request, Representation and an Expiration-Function.

A Root-Request is an externally injected Request with no Parent-Request. A Sub-Request is a request initiated by an Endpoint whilst responding to a Parent-Request.

An Expiration-Function is a software function attached to a Response which determines if the Response is expired. When a response is expired the Representation that it holds cannot be guaranteed to be valid and must be re-requested. The Expiration function can be one of:

1. Always-Expired—the response is immediately expired and always will be.
2. Never-Expired—the response is not expired and will never expire.
3. Timed-Expiry—the response will become expired at the given time and will remain expired from that time onward.
4. Dependent-Expiry—the response will be expired if the response from any of the sub-requests is expired. If there are no sub-requests then the response will never expire.
5. Min-Timed-Dependent-Expiry—the response will be expired at a given time or if any response from a sub-request is expired.
6. Max-Timed-Dependent-Expiry—the response will be expired when any response from a sub-request is expired and the time is after the given time.

7. Endpoint-Function—the response will be expired when endpoint supplied function first returns true and will remain expired from that time onward.

A Kernel acts as intermediary for all requests issued to and from Endpoints. The Kernel receives requests, resolves endpoints, assigns physical execution threads to endpoints and routes responses. It may do this using either a synchronous or asynchronous mechanism.

Immediate Request Scope is a portion of a Request Scope and identifies the list of contexts necessary to resolve a given Request. This excludes any additional scope that would be relevant for the handling of any possible sub-requests. Request Scope order is preserved.

Method

Caching strategies are an engineering compromise requiring judgment and experimentation to determine the system trade offs. One important observation is that memory space for caching has a real economic cost and so the performance time benefits of caching incur spacial costs. Regardless of the total space allocated, it will be understood by those skilled in the art that caching algorithms which minimize spacial storage costs without compromising lookup time are deemed more advantageous to the overall system than those that do not.

A further sub-class of caching is the memoization of deterministic software functions. Memoization is the technique that certain deterministic functions can be made more efficient if they implement storage such that for a given set of calling parameters they can lookup and, if present, return from the store a corresponding pre-computed return value. Memoization can be explicitly coded into a function by the programmer or, as has been demonstrated in the CLAMP library for Common Lisp, can be automatically provided as a dynamic language framework. One important constraint is that a function can only be memoized if it is deterministic and its input parameters are 'referentially transparent', meaning that any function parameter can be replaced with its value without changing the result. Non-deterministic functions that have externally scoped references or that have side-effects cannot be memoized.

A resource oriented computing (ROC) system is one in which logically identified resources form the basis for a computing system. Computation occurs by issuing resource requests into an address space context for resolution to an endpoint which is able to reify the logical resource as a concrete physical representation.

Applicants have found that it is advantageous to implement a resource oriented computing system using an intermediary Kernel which embodies Applicants' ROC algorithm. The Kernel will receive resource requests, implement resolution through a multivalent contextual address space, and assign physical execution threads to perform reification in a resolved endpoint. This invention comprises a cache strategy that systemically optimizes both context resolution and physical endpoint computation cost and that also minimizes cache memory space requirements by tracking the scope of the contextual address space employed during the ROC process.

Many requests in a ROC system are stateless and have no side-effects. Beneficial performance improvements can be gained for subsequent requests for the same resource if the response from issuing an earlier request is cached. For requests which have side-effects or which are otherwise deemed un-cacheable it is still possible to cache the resolution of a request. Resolution is the method of determining an endpoint to handle a request and the request scope for subsequent sub-requests.

It is advantageous in a ROC system to form a graph of address space contexts whereby one context may import one or more other contexts. Typically contexts comprise nested layers to form tiered architectures which provide many practical benefits including reusability, independent development lifecycles, versioning, hot deployment, security and validity assurance. Furthermore the relative relationships between contexts also yield many high-value logical resource oriented software patterns such as, for example, the overlay pattern in which one address space context may wrap another context and present the wrapped context's address space as its own in such a way that it may transparently resolve to an endpoint in the overlay context requests that appear to be targeted to the overlaid space. Another design-pattern comprises the dynamic creation and insertion of a context into a request scope. In general, Applicants' contextual ROC algorithm results in a highly dynamic set of address space contexts.

An endpoint with responsibility for handling a request in one context may issue sub-requests. Due to the dynamic nature of ROC contextual address spaces outlined above, it is clear that the resolution to an endpoint will result in using many contexts. Therefore, representations obtained from endpoints generally have rich and complex caching metrics including computational cost, contextual scope, and validity and expiration lifetimes.

A preferred embodiment describes cache mechanisms and caching metrics and a method by which they are accumulated and used to manage efficient caching in an ROC system.

Using Applicants' ROC algorithm, a Kernel interacts with a suitable coherent, implementation specific, arrangement of contexts, and the Kernel efficiently coordinates the resource oriented computing model including maintaining the resource resolution scope and resource request scope.

In a prior art operating system, a kernel would be pre-programmed to encode a logical address space wherein that kernel could resolve endpoints. In marked contrast, Applicants' ROC algorithm proffers one or more resource requests to the Kernel, wherein each resource recites a context scope comprises one or more contexts. The Kernel provides the resource request to each recited context seriatim, and waits for a response.

The selected context proffers the request to each potential endpoint encoded therein. In a successful resolution of a resource request, a context returns an Endpoint comprising a function that can reify the resource request to a physical representation, i.e. evaluate the request.

Therefore, a request for a resource in Applicants' ROC system is handled by the Kernel in two broad phases: resource request resolution and resource request evaluation. Applicants have found that each of these phases benefits from caching, and in a preferred embodiment a Kernel independently maintains both a Resolution Cache and a Representation Cache. When the system boots, the Kernel is given a reference to a Resolution Cache and a reference to a Representation Cache In certain embodiments, the Resolution Cache is physically implemented using one or more first hash maps. In certain embodiments, the Representation Cache is physically implemented using one or more second hash maps.

Figure 2:
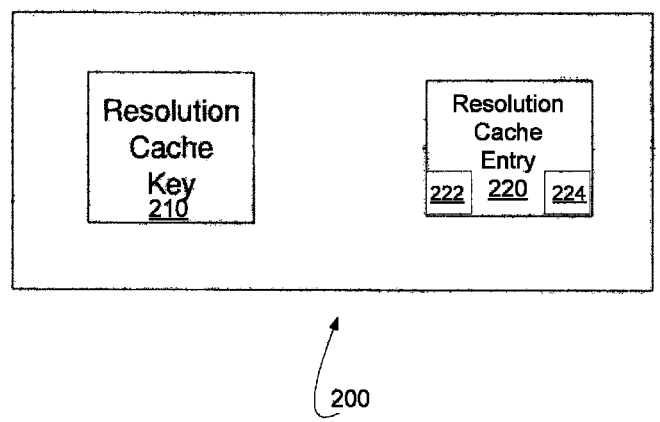
FIG. 2 illustrates one embodiment of Applicants' resolution cache.

Referring now to FIG. 2, a Resolution Cache, such as resolution cache 200, stores in a Resolution Cache entry 220 a Resolution Representation 224 with an associated Request Scope Transform 222. If, when consulted for an Unresolved Request, a match is made between an associated Resolution Cache Key 210 and an instant Resource Request, then the Request Scope Transform 222 may be used to map from the instant Request Scope, such as Request Scope 100 (FIGS. 1A, 1B, 1C, 5), to a resolved Request Scope. Such a successful resolution of a resource request obviates the need to issue the instant Resource Request seriatim into the contextual address spaces recited in the Resource Request 500 in order to locate an endpoint.

Figure 3:
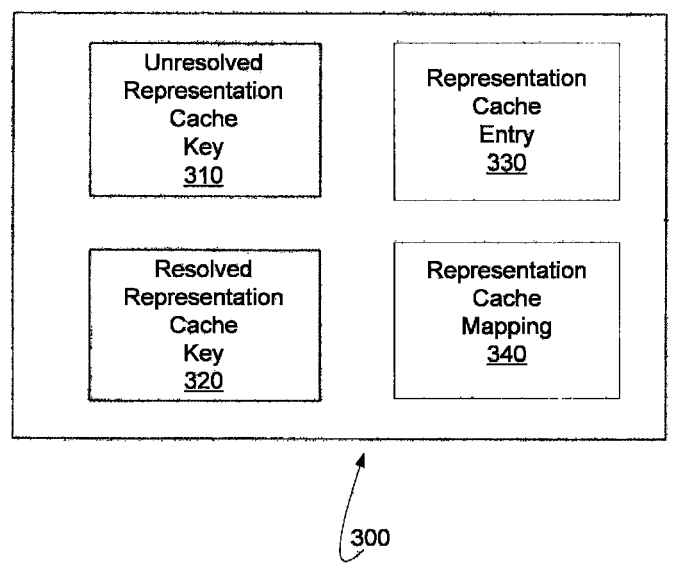
FIG. 3 illustrates one embodiment of Applicants' representation cache.

Referring now to FIG. 3, Representation Cache 300 stores in one or more Representation Cache Entries 330 a set of resource representations obtained from endpoint executions. If, when consulted for an instant Resource Request, a match is made then a returned resource representation, in the form of a Response, may be directly returned to the Requestor obviating the need to evaluate the Resource Request using an endpoint.

Operational Details

FIG. 4 summarizes the interaction between the Kernel, the Resolution Cache, the Representation Cache, and the accumulation of Cache-Metrics by the Kernel as it performs ROC request handling in a contextual ROC system. Referring now to FIG. 4, in step 1 the Kernel waits for a Request.

Referring now to FIG. 5, Resource Request 500 comprises data-structures comprising a Resource Identifier 510 of the resource, a Verb 520 defining an action on the resource, and a Request Scope 100 (FIGS. 1A, 1B, 1C, 5) that specifies the address space context in which to resolve the resource. The Kernel may receive Requests from two distinct sources: a Root-Request is initiated by an external event, often an application protocol transport handler, and has a Request Scope constructed by the external event handler, a Sub-Request may originate from an Endpoint and has Request Scope that has resulted from the evaluation of the contextual ROC system to that point. The Request received at Step 1 comprises an Unresolved Request.

The Kernel constructs Request-State information structure 600 (FIG. 6) which is valid for the duration of each Request. The Request-State 600 comprises a State-Pointer 610, Cache-Metrics 620, a list 630 for holding Request-State for any Sub-Request that may arise from handling the Request, and a reference 640 to a Request-State of the Parent-Request if this request is a Sub-Request. The Request-State also implements a callback function 650 such that a Sub-Request may indicate its completion to the parent Request.

Figure 7:
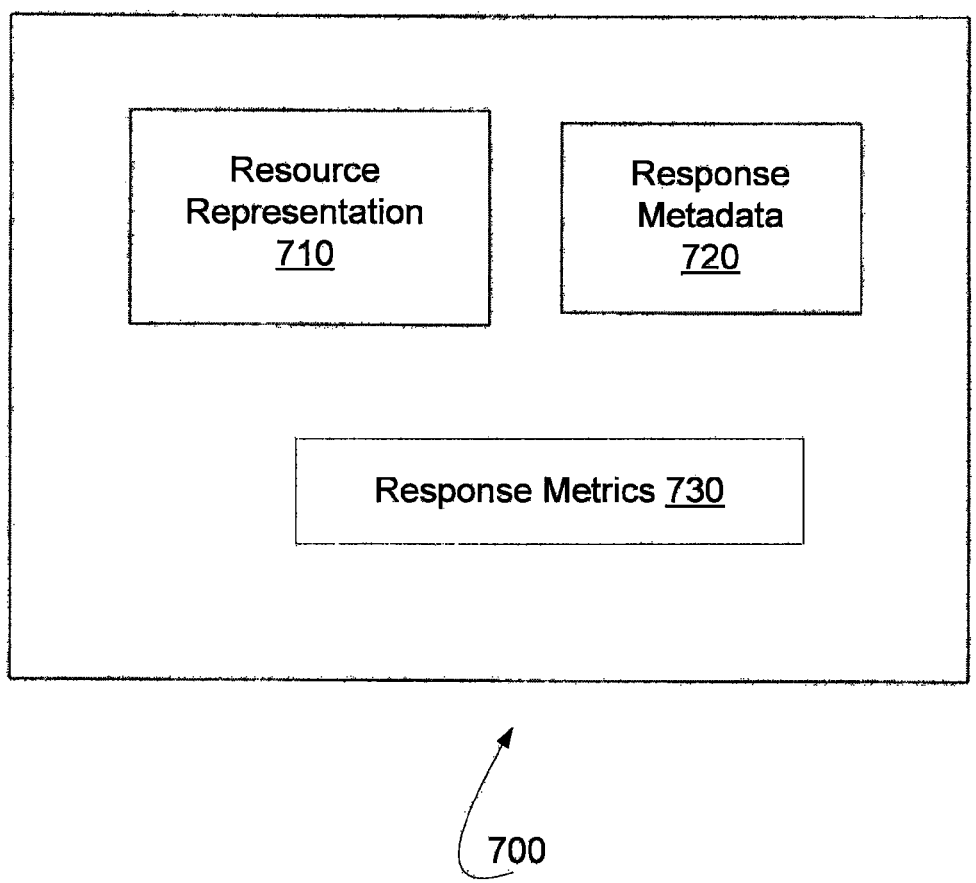
FIG. 7 illustrates one embodiment of Applicants' Representation Cache Entry architecture.

Referring once again to FIG. 4, in step 2 the Kernel interrogates the Representation Cache 300 (FIG. 3) with the Unresolved Request 500 (FIG. 5) received in step 1. The data structures of the Unresolved Request are inspected by the cache in order to compute an Unresolved-Representation Cache Key 310 under which the cache would store a representation if an equivalent Request had been previously made. If the cache matches the Unresolved Cache Key with the Unresolved Request, then a resource representation 710 (FIG. 7), if not expired, is returned in the form of a Response to the Kernel which in Step 13 returns this Response to the Requestor. The details of the Unresolved-Representation Cache Key and its equivalence with respect to Unresolved Requests are described hereinbelow.

Referring once again to FIG. 4, in step 3, if the Representation Cache cannot match an Unresolved Representation Cache Key with an instant Resource Request, then the Kernel interrogates the Resolution Cache 300 (FIG. 3). The Resolution Cache stores a Resolution Representation and Request Scope Transform 222 in a Resolution Cache Key 210. The method to match a Resolution Cache Key and its equivalence to an Unresolved Requests is described hereinbelow when describing step 6. Each Resolution Representation encoded in a Resolution Cache Entry comprises an Endpoint reference and a resolved request scope.

If a Resolution Cache Key 210 matches an Unresolved Resource Request, the Resolution Cache obtains an associated Resolution Cache Entry 220 and applies a Request Scope Transform 222 encoded therein to the request scope of the Unresolved Request to compute a Resolved Request Scope. The cache obtains a copy of a Resolution Representation 224 encoded in a Resolution Cache entry 220 associated with the matching Resolution Cache Key 210, and associates it with computed Resolved-Scope. The Resolution Cache returns to the Kernel the Resolution Representation 224 with the computed Resolved-Scope. The details of the application of the Request Scope Transform are described in Step 6 hereinbelow.

Referring once again to FIG. 4, in step 4 if the Resolution Cache cannot match a Resolution Cache Key with an Unresolved Request then the request must be resolved. Resolution of the Unresolved Request is the process by which Applicants' ROC algorithm locates the Endpoint to evaluate the request. The resolution process creates a Request Scope for potential Sub-Requests issued from the resolved Endpoint. Furthermore, the resolution process determines a Resolution High Water Mark, being an integer value corresponding with the range of request scopes traversed during the resolution process. In embodiments wherein the Resource Request 500 comprises an (N) dimensional context scope, then Applicants' resolution process creates a Resolution High Water Mark comprising (N−1) dimensions.

The Resolution process starts with an Unresolved Request scope and attempts to resolve an endpoint using the contexts in this scope, nearest (head) first. That resolution generates a new resolved request scope which may comprise contexts from the original request scope and new contexts added by context resolution delegation.

Contexts that do not resolve may be popped, i.e. removed from the request scope, and will not be present in the resolved request scope. In certain embodiments, contexts that do not resolve may nevertheless be designated as durable contexts that although tested and deemed not relevant, must be reattached to a resolved request scope upon completion of the resolution. As the resolution process is occurring the Kernel maintains a list of contexts in which resolution has been attempted.

This list comprises an Immediate Request Scope. The length of this list when subtracted from the length of the Request Scope 100 (FIGS. 1A, 1B, 1C, 5) of the Unresolved Request 500 constitutes a Resolution High Water Mark for this Resolution. The resolution process may result in a cycle of resolution requests. The Kernel ensures that the Resolution High Water Mark is updated such that when resolution has completed the Resolution High Water Mark is a length of the Request Scope of the Unresolved Request minus the minimum length of any of the Immediate Request Scopes constructed during the resolution cycle. As a refinement, during the resolution process an Endpoint may issue Sub-Requests. As will be described hereinbelow, a Request State 600 may receive callbacks signaling the completion of Sub-Requests. The Resolution High Water Mark must also take into account the scope visited by Sub-Requests issued during the Resolution process. If any Sub-Request's Unresolved-High-Water-Mark (described below) is smaller than the Resolution High Water Mark the Resolution High Water Mark takes that value.

A Resolution Representation comprises an information structure comprising a resolved Endpoint and the resolved Request Scope that sub-requests issued by said Endpoint should use.

Referring once again to FIG. 4, in step 5 if Resolution is unsuccessful the Kernel generates a Resolution error and issues this Resolution error as the response to the Requestor Step 13.

In step 6, if Resolution is successful the Kernel will update the Resolution Cache 300. The Kernel instructs the Resolution Cache 300 to store a Resolution-Response and provides it with a Resolution High Water Mark and the Unresolved Request from which the Resolution Cache constructs a Resolution Cache Key 210. Furthermore the Resolution Cache computes and stores in a Resolution Cache entry 220 the Resolution-Response 224 and a Request Scope Transform 222 as follows:

1. Find the Significant Contexts being the list of Contexts of the Unresolved Request with list position from tail (broadest context) greater than or equal to the Resolution High Water Mark.
2. Find the Resolution-Significant Contexts being the list of Contexts of the Resolved Request with list position from tail (broadest context) greater than or equal to the Resolution High Water Mark.
3. Construct a Durability List being a list of boolean values, whose members comprise for each Context in the Resolution-Significant Contexts a boolean true if the Context is marked Durable.

For each Context in the Resolution-Significant Contexts determine if it is present in the Significant Contexts. If it is then replace it with an integer being the position of the matched Context in the Significant Contexts. Upon completion of this process the Resolution-Significant Contexts constitutes a list of Context or Integer values. The Resolution Transform 222 comprises the Resolution High Water Mark, the Durability List and the Resolution-Significant Contexts, and is stored with the Resolution-Response in the Resolution Cache under the Resolution Cache Key.

In order to determine in step 3 if a stored Resolution Cache Key matches an instant Resource request, the Resolution Cache 300 is interrogated and a Resource Identifier 510 and Request Scope 100 (FIGS. 1A, 1B, 1C, 5) of the Unresolved Request 500 are used to construct a test Resolution Cache Key. To successfully match a cached entry the Resource-Identifier 510 of the Unresolved Request 500 must exactly match a Resource-Identifier recited in a stored Resolution Cache Key 210.

In contrast, the context scope recited in the stored Resolution Cache Key need only be equivalent to, and not necessarily equal to, the context scope 100 recited in the instant Resource Request 500. The context scope 100 recited in the Unresolved Request scope need only overlap with the Request Scope of the stored Resolution Cache Key 210 to a sufficient Comparison-Depth comprising a length of the Request Scope of the Resolution Cache Key minus a Resolution High Water Mark recited in the Resolution Cache Key. Furthermore, it is sufficient for the context scope comparison to use Resolution-Equality to compare Contexts. Resolution-Equality comprises a weak equality in which two Contexts are Resolution-Equal when they will resolve the same set of requests. Resolution-Equal Contexts are not required to resolve requests to the same resources. The implementation of a Resolution-Equality comparison function is implementation specific to the Context. Resolution-Equality is sufficient since it is common that trivial variants of a Request Scope present themselves.

Applicants' Request Scope comparison algorithm proceeds as follows:

Comparison commences from the head, i.e. context 110 (narrowest context) of the Request Scope 100 (FIGS. 1A, 1B, 1C, 5) of the Request 500 and the head of the Resolution Cache Key's Request Scope. Contexts from each list with the same position are compared, here using Resolution-Equality. If they are equal the next Context in the two lists is compared. If they are different then the context scopes are not equivalent. This process continues for each Context in the list terminating if the number of comparisons equals the Comparison-Depth or the end of the Request scope is reached, whereby it is deemed that the Request Scopes are equivalent.

Upon successfully matching a Resolution Cache key with an Unresolved Resource Request, the Resolution Cache 300 obtains a Resolution Representation from an associated Resolution Cache Entry 220 and using an associated Resolution-Transform 222 computes a Resolved Request Scope as follows:

1. The Unresolved Request Scope is truncated by removing the Residual-Contexts being the list of Contexts with list position from tail (broadest context) greater than or equal to the Resolution High Water Mark.
2. For each item in the Resolution-Significant Contexts, if the item is an integer index, locate the Context in the Residual-Contexts and append that Context to the head of the truncated Unresolved Request Scope. If the item is a Context, append it to the head of the truncated Unresolved Request Scope. In both cases, by "appending" Applicants' ROC algorithm ensures that any durability indicator obtained from the Durability List at the same index as the index of the item currently under consideration from the Resolution-Significant Contexts is applied to the attached Context.

Referring once again to FIG. 4, in step 7, when the Kernel receives a Resolved Resource Request, obtained either at Step 3 or Step 4, the Kernel interrogates a Representation Cache 400 with the Resolved Resource Request. The relevant data structures of the Resolved Resource Request are inspected by the cache in order to compute a Resolved-Representation Cache Key under which the cache would store a representation should an equivalent Request have been made before.

In step 8, if the Representation Cache 400 matches a Resolved Representation Cache Key with an instant Resource Request, then Representation Cache 400 returns a resource representation recited in a Representation Cache Entry associated with the matched Representation Cache Key, in the form of a Response, to the Kernel which returns this to the Requestor. The details of the Resolved-Representation Cache Key and its equivalence with respect to Resolved Requests are described below. Furthermore, since the initial Unresolved Request test of the Representation Cache failed at Step 2, the Kernel updates the Representation Cache 400 giving it the Unresolved Request and instructing that it should construct an Unresolved-Representation Cache Key 310 and add this Unresolved-Representation Cache Key 310 to resource representation returned for the Resolved Request interrogation.

If in step 7, the representation cache does not contain an entry for the Resolved Request the method transitions to step 10.

In step 9, if the Representation Cache contains a representation for the Resolved Request (returned at step 3) it is returned, in the form of a Response, to the Kernel which returns this to the Requestor.

If the Representation Cache does not contain a Representation for the Resolved Request (at steps 7 or 9) then in Step 10 the Kernel issues the Resolved Request to the resolved Endpoint. The Endpoint then performs its operation, including possibly making and issuing further re-entrant Sub-Requests. Upon completion of its evaluation the Endpoint returns a Response to the Kernel.

When the Endpoint is invoked by a Kernel processing thread, the Kernel is able to time the duration of the Endpoint operation. Timing may be performed using simple absolute time deltas against a known sufficiently high-resolution standard clock. In a preferred embodiment, by employing Threads that provide a true measure of their CPU scheduling time, the true CPU execution time for the Endpoint operation may be determined. Should a re-entrant Sub-Request arrive from the Endpoint during its operation then the Kernel must pause the timing of the Endpoint operation until the Sub-Request's response is returned to the Endpoint at which point timing is resumed—the mechanism for this is described below.

When the Endpoint returns its Response for the Resolved Request the total processing time for this Endpoint's handling of the request is present in the Request-State. The time of operation of the Endpoint constitutes a Cost value for the ROC computation.

The Request State 600 constructed at Step 1 provides a means for coordination of and communication between a Request and a Sub-Request. When a Sub-Request is issued from an Endpoint then, at Step 1, the Kernel knows an associated parent-Request's Request-State and will pause the timing of the parent Request. Furthermore when a Sub-Request completes (Step 13) the Kernel signals this completion to the Parent Request by calling the callback function 650 of a parent Request-State 600, providing the Request-State 600 of the completed Sub-Request. In this way, the Parent-Request accumulates in its list of Request-States the Request-State of each completed Sub-Request. Because each Sub-Request is a Request and goes through the same process then each completed Sub-Request also has a timed cost.

In step 10, when the Endpoint returns its Response, Cache-Metrics of Total-Cost, Expiration-Function, Unresolved-High-Water-Mark and Resolved-High-Water-Mark can be computed. At this point all synchronous sub-requests will have completed and any asynchronous sub-requests that have not completed must be ignored when computing caching metrics.

Total-Cost is computed as the sum of the Endpoint processing time plus the sum of all Sub-Request times having unique representations. The uniqueness of representation criterion is introduced as an efficient way to avoid double counting.

Applicants' Expiration Function pertains to the lifetime of resource representations returned to the Kernel by an Endpoint. Those Expiration Functions returned in an Endpoint Response include:

1. Always-Expired—the Expiration-Function is from the Endpoint Response—Always-Expired
2. Never-Expired—the Expiration-Function is from the Endpoint Response—Never-Expired.
3. Timed-Expiry—the Expiration-Function is from the Endpoint Response—Timed-Expiry.
4. Dependent-Expiry—the Expiration-Function is dynamically generated by combining the Expiration-Function of all sub-request Responses with a logical OR function. Optimization can be made where any function is Always-Expired. Duplicates are detected and are omitted.
5. Min-Timed-Dependent-Expiry—the Expiration-Function is dynamically generated by combining the Expiration-Function of all sub-request Responses and the Timed-Expiry function with a logical OR function. Optimization can be made where any function is Always-Expired. Duplicates are detected and are omitted.
6. Max-Timed-Dependent-Expiry—the Expiration-Function is dynamically generated by combining the Expiration-Function of all sub-request Responses with a logical OR function which is then combined with the Timed-Expiry with a logical AND function. Duplicates are detected and are omitted.
7. Endpoint-Function—the Expiration-Function is the Endpoint Response's Endpoint-Function.

An Unresolved-High-Water-Mark is computed as an integer value and is the Resolution High Water Mark or, if smaller, the smallest Unresolved-High-Water-Mark of any sub-request.

A Resolved-High-Water-Mark is computed as an integer and is the size of the Resolved Request scope or, if smaller, the smallest Unresolved-High-Water-Mark of any sub-request.

The Kernel constructs a Response for the Requestor. It contains the Representation, Unresolved Request and Response Metadata, which includes the Cache Metrics.

In step 11, the Kernel makes an update to the Representation Cache 400 by providing the Response and a Resolved Request. From the Response the Representation Cache 400 constructs a Representation Cache Entry 700 (FIG. 7) comprising a Resource Representation 710, Response-Metadata 720 which includes a cost metric and Response-Metrics 730 via an item-hit counter and last touched time.

Figure 8A:
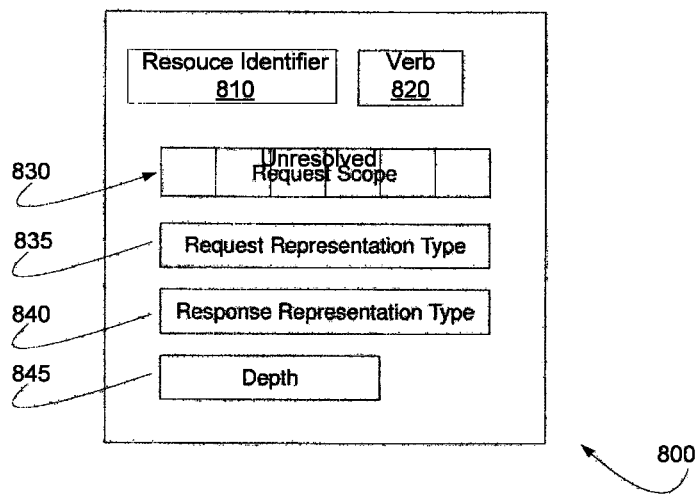
FIG. 8A illustrates one embodiment of Applicants' Unresolved Representation cache Key architecture.
Figure 8B:
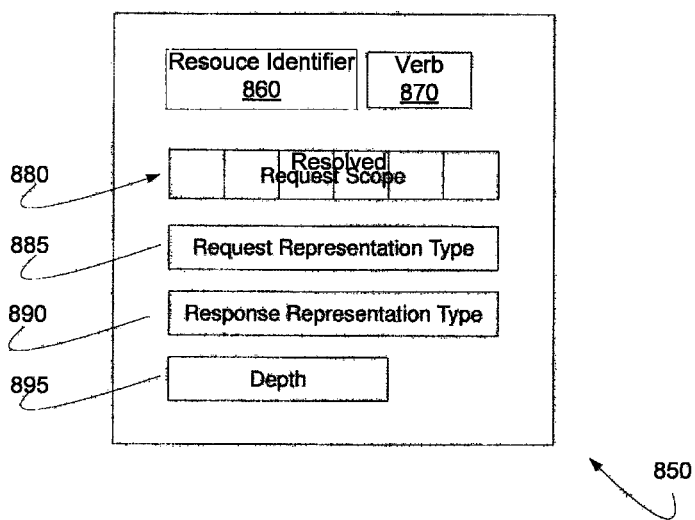
FIG. 8B illustrates one embodiment of Applicants' Resolved Representation Cache Key architecture.

Using the Unresolved Request, obtained from the Response, the Representation Cache 400 computes an Unresolved-Representation Cache Key 800 (FIG. 8A) comprising a Resource-Identifier 810, Verb 820, Unresolved Request scope 830, Requested-Representation type 835, Response-Representation type 840, and a computed scope Depth comprising the length of the Unresolved Request scope minus the Unresolved-High-Water-Mark.

Using the Resolved Request, the Representation Cache computes a Resolved-Representation Cache Key 850 comprising a Resource-Identifier 860, Verb 870, Resolved Request scope 880, Requested-Representation type 885, a Response-Representation type 890, and a computed scope Depth 895 comprising the length of the Resolved Request scope minus the Resolved-High-Water-Mark.

Returning to Steps 2 and 9 where the Kernel interrogates the Representation Cache using the Unresolved and Resolved Request, respectively. The Representation cache constructs a test key from a Resource Request 500. The test key comprises the Resource Identifier 510, Verb 520, Request scope 100 (FIGS. 1A, 1B, 1C, 5), and a Request Representation Type.

The test key is compared with the stored cache keys using the following equivalence algorithm. The Resource Identifiers 510 and 810/860 must be identical. Verb 520 and Verb 820/860 must be identical. The request's Request Scope 100 and the cache key's Request Scope 830/880 must be equivalent, the comparison is made using the scope equivalence algorithm described hereinabove but here the Comparison-Depth is a Representation Cache Key depth. The Request-Representation-Type of the test key is instanceof equivalent to Cache Key Request-Representation-Type 835/885. In addition, the test key's Requested-Representation-Type is instanceof equivalent to the Response-Representation-Type 840/890 of the cache key.

If this algorithm is true then the cached Item is deemed to be a valid resource satisfying the ROC request and the Representation, in the form of a Response, is returned so that it may be issued by the Kernel as the Requestor response Step 13.

It will be understood by those skilled in the art that the mapping 340 from a Representation Cache Key 310/320 to a Representation Cache Entry 330 may be accomplished in a variety of embodiments. One preferred embodiment is to employ a Hashmap based cache. It constitutes an efficient mechanism for a cache as it has constant get/put times o(1) if a suitable hash function is available. However implementing a suitable hash function can be difficult. A simple but bad hash would use just the Resource identifier. A problem can arise using this hash function because many resources are often accessed with the same identifier but with differing scopes. In the extreme this pushes the performance of the cache for get/put toward linear time o(N). In certain embodiments, Applicants' method uses a hash based upon the identifier for a resource and hashes for each Context that is within the Representation Cache Key's Request Scope combined using bitwise XOR. This ensures that all unique resources have the potential for a unique hash even if they share common identifiers.

However when attempting to get a Representation from the Representation Cache the sub-list of Contexts from the Request's Request Scope that are necessary to construct the corresponding hash for the Representation Cache Key is not known. Applicants' ROC algorithm utilizes a Representation-Scope-Depth-Map comprising a map of Scope-Depth integers keyed on the single head Context from the Request Scope, the Request Identifier and the Request-Verb. The Scope-Depth being Representation Cache Key's Depth. The Representation Cache Key's hash is then computed by constructing a key into the Representation-Scope-Depth-Map using fields in the Request. If a Depth value is found the Representation Cache Key is then computed using the bitwise XOR'd method described above but only considering Contexts in the Request Scope up to Depth from the head.

The Representation-Scope-Depth-Map is populated such that when a new item is to be stored in the Representation Cache: First an attempt is made to find a Depth corresponding with the Request using a key constructed on the single head Context from the Request Scope, the Request Identifier and the Request-Verb. If none is present then a new map entry is added being the Depth of the Representation Cache Key (as described above) and keyed under the single head Context from the Request Scope, the Request Identifier and the Request-Verb.

Cache Management Strategy

In order to balance the space/time constraints of Applicants' ROC algorithm, the Entries stored in a Representation Cache can be managed to hold the system's instantaneously most valuable resource representations. An item's Value may be determined as a function of: the computation cost which, as is described above, is determined as an explicit-Cache Metric, Time-Since-Last-Used, and Total-Usage-Count. Where usage is defined as: the cache, upon interrogation, returning the Item and incrementing the Total-Usage-Count. For efficiency it is effective to compute Value as a reciprocal index where zero is most valuable and Value reduces the greater the index. A simple reciprocal value index is then proportional to Time-Since-Last-Used and inversely proportional to Computation Cost and Total-Usage-Count.

The Entries stored in the Resolution Cache can be managed to hold resolutions to the system's instantaneously most frequently resolved Endpoints. An item's Value may be determined as a Time-Since-Last-Used and Total-Usage-Count. As with Representation Cache, the value is efficiently computed as a reciprocal index proportional to Time-Since-Last-Used and inversely proportional to Total-Usage-Count.

Those skilled in the art will understand that periodically a cache may remove those Entries deemed to be least valuable in order to strike an economic system balance. Those skilled in the art will understand that balancing a cache is a achieved by adjusting parameters such as total cache size, period between cache management cycles, maximum total system memory load, etc. It will be apparent that the Cache-Metrics described above present very clear determinants of system value against which the cache parameters may be judged.

It will be understood that for variations of Applicants' ROC system many additional Cache-Metrics may also be generated and used during the method of FIG. 4. For example a Resource Request may have a priority or may belong to a certain user group or a response may explicitly declare a cache boost level to raise its relative cache value or may originate from a remote network system, it will be clear that these cache-metrics may provide additional contributions to the value index of a cache item.

Furthermore it will be apparent to those skilled in the art that the scope level equivalence permitted by the Invention permits a single cache Entry to be stored for a given Resource (Representation Cache) or Endpoint-Resolution (Resolution Cache) even when, by the highly dynamic nature of ROC scoping, the scope of the Resource Request may vary widely, thereby minimizing total storage cost. Furthermore it will be understood by those skilled in the art that Applicants' method generalizes Memoization, and within Applicants' ROC algorithm makes Memoization extrinsic thereby permitting the outcome of all ROC implemented software functions to be stored and their usefulness to be determined based upon the external address-space context of the Requestor. Furthermore it will be understood by those skilled in the art that the accumulation of expiry-functions results in a Representation Cache Entry having a dependency hierarchy on all resources that were requested during its reification and if a dependent-expiry function was used ensures that the item is valid only so long as all its dependents are valid.

It will be understood by those having studied Thermodynamics that many real-world processes obey regular statistical distributions. Applicants have found that their ROC systems for real-world computational systems often comprise Normal distributions wherein Applicants' method enables a systemic discovery and reuse of a dynamically balanced Normal Resource Set thereby dramatically reducing total computation energy and storage costs.

The following examples are presented to further illustrate to persons skilled in the art how to make and use the invention. These examples are not intended as a limitation, however, upon the scope of the invention.

Example 1

Demonstrate Representation Cache Operation with Representation Cache and Resolution Cache Empty Requestor sources resource with identifier X as representation class Y in scope S1;
Unresolved Request Representation Cache GET fails;
Resolution Cache GET fails;
Request is resolved;
Resolution Representation is PUT into Resolution Cache;
Resolved Request Representation Cache GET fails;
Endpoint reifies representation;
Caching-Metrics computed;

Representation PUT into Representation Cache under resolved and Unresolved cache keys; and Representation returned to Requestor.

Example 2

Demonstrate Representation Cache Operation with Representation Cache and Resolution Cache Populated Requestor sources resource with identifier X as representation class Y in scope S1;
Unresolved Request Representation Cache GET succeeds; and
Representation returned to Requestor.

Example 3

Demonstrate Representation Cache when Representation Requested from Alternate Scope Requestor sources resource with identifier X as representation class Y in scope S2;
Unresolved Request Representation Cache GET fails;
Resolution Cache GET fails;
Request is resolved;
Resolution Representation is PUT into Resolution Cache;
Resolved Request Representation Cache GET succeeds;
Additional Unresolved scope put into Representation Cache; and
Representation returned to Requestor.

Example 4

Demonstrate Resolution Cache with Resolution Cache Populated

Requestor sources resource with identifier X2 as representation class Y in scope S1;
Unresolved Request Representation Cache GET fails;
Resolution Cache GET succeeds;
Endpoint reifies Representation;
Endpoint reifies representation;
Caching-Metrics computed;
Representation cannot be cached because it Expires-Immediately; and
Representation returned to Requestor.

In certain embodiments, individual steps recited in FIG. 4 may be combined, eliminated, or reordered.

In certain embodiments, Applicants' invention comprises an article of manufacture, such as a computing device, comprising at least one computer readable medium and a programmable processor. In certain embodiments, Applicants' ROC algorithm is encoded in the at least one computer readable medium. In certain embodiments, the first address space and the second address space each comprise a portion of the at least one computer readable medium. In certain embodiments, Applicants' computing device comprises for example and without limitation a mainframe computer, personal computer, workstation, and combinations thereof.

Applicants' computer program readable code is encoded in the at least one computer readable medium, wherein the computer program readable code is executable by the processor to perform one or more of steps 1, 2, 3, 4, 5, 6, 7, 8, 9, 10, 11, 12, and/or 13, recited in FIG. 4.

In other embodiments, Applicants' invention includes computer readable program code encoded in any other computer program product written to a computer readable medium, where that computer readable program is executed by a computing device to perform one or more of steps 1, 2, 3, 4, 5, 6, 7, 8, 9, 10, 11, 12, and/or 13, recited in FIG. 4. In either case, the computer program readable code may be encoded in a computer readable medium comprising, for example and without limitation, a magnetic information storage medium, an optical information storage medium, an electronic information storage medium, a holographic information storage medium and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments might occur to one skilled in the art without departing from the scope of the present invention.

We claim:

1. A method to generate and save a resource representation recited by a request encoded in a computer algorithm, comprising:

receiving from a requesting algorithm an Unresolved resource request, wherein said Unresolved resource request is associated with a first context, wherein said first context comprises a first address space, and wherein said Unresolved resource request comprises an Unresolved request scope comprising at least said first context;

resolving said Unresolved resource request to an endpoint, wherein said endpoint is associated with a second context, wherein said second context comprises a second address space;

evaluating said resolved resource request by said endpoint to generate said resource representation;

generating and saving in a cache at least one Unresolved request scope key;

generating and saving in said cache a resolved request scope key;

generating and saving in said cache a cache entry comprising said resource representation;

associating said cache entry with said resolved request scope key and with said at least one Unresolved request scope key using a mapping function encoded in said cache;

wherein said Unresolved resource request comprises a resource identifier and a verb, and wherein said resolving step comprises:

configuring a representation cache comprising one or more representation cache keys, and one or more representation cache entries, wherein each representation cache key comprises a resource identifier, a verb, and a request scope, and wherein each representation cache entry comprises a resource representation and response metadata comprising an expiry determinant; selecting a representation cache key;

determining if said representation cache key matches said Unresolved resource request; operative if said representation cache key matches said Unresolved resource request, determining using an expiry determinant encoded in a representation cache entry associated with said selected representation cache key if a resource representation encoded in said representation cache entry associated with said selected representation cache key has expired;

operative if said resource representation encoded in said representation cache entry associated with said selected representation cache key has not expired, returning to a kernel function said resource representation encoded in said representation cache entry associated with said selected representation cache key.

2. The method of claim 1, wherein said first context and said second context are the same.

3. The method of claim 1, wherein said first context and said second context differ.

4. The method of claim 1, wherein each representation cache key comprises a resource identifier, a verb, and a request scope, and wherein said determining if said representation cache key matches said Unresolved resource request comprises:
   determining if a cache key resource identifier recited in said selected representation cache key is the same as an unresolved resource request resource identifier recited in said Unresolved resource request, and if a verb recited in said selected representation cache key is the same as a verb recited in said Unresolved resource request;
   operative if said cache key resource identifier is the same as said unresolved resource request resource identifier, and if said verb recited in said selected representation cache key is the same as said verb recited in said Unresolved resource request, determining if said Unresolved request scope is equivalent to a request scope recited in said selected representation cache key;
   operative if said cache key resource identifier is the same as said unresolved resource request resource identifier, and if said verb recited in said selected representation cache key is the same as said verb recited in said Unresolved resource request, and if said Unresolved request scope is equivalent to a request scope recited in said selected representation cache key, determining that said selected representation cache key matches said Unresolved resource request.

5. The method of claim 1, wherein no representation cache key matches said Unresolved resource request, further comprising:
   configuring a resolution cache comprising one or more resolution cache keys;
   selecting a resolution cache key;
   determining if said resolution cache key matches said Unresolved resource request;
   operative if said resolution cache key matches said Unresolved resource request:
   transforming said Unresolved request scope into a computed request scope;
   transforming said Unresolved resource request into a resolved resource request comprising said computed request scope.

6. The method of claim 5, wherein each resolution cache key comprises a resource identifier, a verb, and a resolved request scope, and wherein said determining if said resolution cache key matches said resource request comprises:
   determining if said cache key resource identifier is the same as said unresolved resource request resource identifier, and if a verb recited in said selected resolution cache key is the same as a verb recited in said Unresolved resource request;
   operative if said cache key resource identifier is the same as said unresolved resource request resource identifier, and if said verb recited in said selected resolution cache key is the same as said verb recited in said Unresolved resource request, determining if said Unresolved request scope is equivalent to a request scope recited in said selected resolution cache key;
   operative if said cache key resource identifier is the same as said unresolved resource request resource identifier, and if said verb recited in said selected resolution cache key is the same as said verb recited in said Unresolved resource request, and if said Unresolved request scope is equivalent to a request scope recited in said selected resolution cache key, determining that said selected resolution cache key matches said Unresolved resource request.

7. The method of claim 6, wherein no resolution cache key matches said resource request, further comprising:
   resolving said resource request;
   selecting a representation cache key,
   determining if said selected representation cache key matches said resolved resource request;
   operative if said representation cache key matches said resolved resource request, determining using an expiry determinant encoded in a representation cache entry associated with said selected representation cache key if a resource representation encoded in said representation cache entry associated with said selected representation cache key has expired;
   operative if said resource representation encoded in said representation cache entry associated with said selected representation cache key has not expired, returning to said kernel function said resource representation encoded in said representation cache entry associated with said selected representation cache key.

8. The method of claim 7, wherein said determining if said selected representation cache key matches said resolved resource request comprises:
   determining if said cache key resource identifier is the same as a resolved resource request resource identifier recited in said resolved resource request, and if a verb recited in said selected representation cache key is the same as a verb recited in said resolved resource request;
   operative if said cache key resource identifier is the same as said resolved resource request resource identifier, and if said verb recited in said selected representation cache key is the same as said verb recited in said resolved resource request, determining if said computed request scope is equivalent to a resolved request scope recited in said selected representation cache key;
   operative if said cache key resource identifier is the same as said resolved resource request resource identifier, and if said verb recited in said selected representation cache key is the same as said verb recited in said resolved resource request, and if said computed request scope is equivalent to a resolved request scope recited in said selected representation cache key, determining that said selected representation cache key matches said resolved resource request.

9. The method of claim 1, further comprising:
   maintaining a list comprising a plurality of contexts in which resolution of said resource request has been attempted;
   forming an immediate request scope comprising said list;
   computing a resolution high water mark comprising the difference between a number of contexts recited in the immediate request scope and a number of contexts recited in said Unresolved resource request.

10. The method of claim 9, further comprising:
maintaining a plurality of lists, wherein each list comprises a plurality of contexts in which resolution of said resource request has been attempted by a different subrequest;
forming for each subrequest an intermediate request scope;
computing for each subrequest an Unresolved high water mark comprising the difference between a number of contexts recited in an immediate request scope associated with that subrequest and a number of contexts recited in said Unresolved resource request;
determining if an Unresolved high water mark is less than the resolution high water mark; operative if an Unresolved high water mark is less than the resolution high water mark, setting said resolution high water mark equal to said Unresolved high water mark having a value less than said resolution high water mark.

11. The method of claim 9, wherein said resource request comprises a (N)-dimensional request scope, wherein (N) is greater than 1, further comprising forming a (N−1) dimensional resolution high water mark.

12. The method of claim 9, further comprising generating and returning a resolution error message if resolution of said resource request is unsuccessful.

13. The method of claim 9, further comprising:
configuring a resolution cache;
operative if said resource request is resolved, storing a resolution response in said resolution cache;
generating a resolution cache key using said resolution response, resolution high water mark, and Unresolved resource request;
saving said resolution cache key in said resolution cache.

14. The method of claim 13, further comprising:
computing a request scope transform;
storing said request scope transform in said resolution cache.

15. The method of claim 1, further comprising:
returning to a kernel function a resource representation by said endpoint;
determining a processing time for said endpoint to generate said resource representation;
generating a total cost comprising said endpoint processing time in combination with the total processing times for all sub-requests generating unique resource representations;
generating response metadata comprising said total cost.

16. The method of claim 15, further comprising:
assigning by said endpoint an expiry determinant for said returned resource representation;
adding said expiry determinant to said response metadata.

17. The method of claim 16, wherein said expiry determinant is selected from the group consisting of always-expired, never expired, timed expiry, dependent expiry, minimum timed dependent expiry, maximum timed dependent expiry and endpoint-function.

18. The method of claim 16, wherein said cache determinant of said returned resource representation incorporates a cache determinant for each dependent resource utilized in determining said returned resource representation.

19. The method of claim 16, further comprising generating by said kernel function a response to said requesting algorithm, wherein said response comprises said resource representation and said response metadata.

20. The method of claim 16, further comprising:
generating a representation cache entry comprising said resource representation and said response metadata;
saving said representation cache entry in said representation cache.

21. The method of claim 16, further comprising:
computing an Unresolved representation cache key comprising a resource identifier recited in said resource request, a verb recited in said resource request, said Unresolved request scope, a requested representation type, a response representation type, and a depth comprising a difference between a number of contexts recited in said Unresolved context scope and an Unresolved high water mark;
saving said Unresolved representation cache key in said representation cache;
associating said Unresolved representation cache key with said representation cache entry.

22. The method of claim 16, further comprising:
computing an resolved representation cache key comprising a resource identifier recited in said resource request, a verb recited in said resource request, a resolved request scope, a requested representation type, a response representation type, and a depth comprising a difference between a number of contexts recited in said Unresolved context scope and an Unresolved high water mark;
saving said resolved representation cache key in said representation cache;
associating said resolved representation cache key with said representation cache entry.

23. An article of manufacture comprising a programmable processor and at least one non-transitory computer readable medium, said at least one computer readable medium comprising computer readable program code disposed therein to generate and save a resource representation, the computer readable program code comprising a series of computer readable program steps to effect:
receiving from a requesting algorithm an Unresolved resource request, wherein said Unresolved resource request is associated with a first context, wherein said first context comprises a first address space, and wherein said Unresolved resource request comprises an Unresolved request scope comprising at least said first context;
resolving said Unresolved resource request to an endpoint, wherein said endpoint is associated with a second context, wherein said second context comprises a second address space;
evaluating said resolved resource request by said endpoint to generate said resource representation;
generating and saving in a cache at least one Unresolved request scope key;
generating and saving in said cache a resolved request scope key;
generating and saving in said cache a cache entry comprising said resource representation;
associating said cache entry with said resolved request scope key and with said at least one Unresolved request scope key using a mapping function encoded in said cache;
wherein said Unresolved resource request comprises a resource identifier and a verb, and wherein said computer readable program code to resolve said resource request to an endpoint comprises a series of computer readable program steps to effect:
configuring a representation cache comprising one or more representation cache keys, and one or more representation cache entries, wherein each representation cache key comprises a resource identifier, a verb, and a request scope, and wherein each representation cache entry comprises a resource representation and response metadata comprising an expiry determinant; selecting a representation cache key;

determining if said representation cache key matches said Unresolved resource request; operative if said representation cache key matches said Unresolved resource request, determining using an expiry determinant encoded in a representation cache entry associated with said selected representation cache key if a resource representation encoded in said representation cache entry associated with said selected representation cache key has expired;

operative if said resource representation encoded in said representation cache entry associated with said selected representation cache key has not expired, returning to a kernel function said resource representation encoded in said representation cache entry associated with said selected representation cache key.

24. The article of manufacture of claim 23, wherein:
said first context and said second context comprise a same portion of said computer readable medium.

25. The article of manufacture of claim 23, wherein said first context and said second context differ.

26. The article of manufacture of claim 23, wherein each representation cache key comprises a resource identifier, a verb, and a request scope, and wherein said computer readable program code to determine if said representation cache key matches said Unresolved resource request comprises a series of computer readable program steps to effect:

determining if a cache key resource identifier recited in said selected representation cache key is the same as an unresolved resource request resource identifier recited in said Unresolved resource request, and if a verb recited in said selected representation cache key is the same as a verb recited in said Unresolved resource request;

operative if said cache key resource identifier is the same as said unresolved resource request resource identifier, and if said verb recited in said selected representation cache key is the same as said verb recited in said Unresolved resource request, determining if said Unresolved request scope is equivalent to a request scope recited in said selected representation cache key;

operative if said cache key resource identifier is the same as said unresolved resource request resource identifier, and if said verb recited in said selected representation cache key is the same as said verb recited in said Unresolved resource request, and if said Unresolved request scope is equivalent to a request scope recited in said selected representation cache key, determining that said selected representation cache key matches said Unresolved resource request.

27. The article of manufacture of claim 23, wherein no representation cache key matches said Unresolved resource request, said computer readable program code further comprising a series of computer readable program steps to effect:
configuring a resolution cache comprising one or more resolution cache keys;
selecting a resolution cache key;
determining if said resolution cache key matches said Unresolved resource request;
operative if said resolution cache key matches said Unresolved resource request:
transforming said Unresolved request scope into a computed request scope;
transforming said Unresolved resource request into a resolved resource request comprising said computed request scope.

28. The article of manufacture of claim 27, wherein each resolution cache key comprises a resource identifier, a verb, and a resolved request scope, and wherein said computer readable program code to determine if said resolution cache key matches said resource request further comprises a series of computer readable program steps to effect:

determining if said cache key resource identifier is the same as said unresolved resource request resource identifier, and if a verb recited in said selected resolution cache key is the same as a verb recited in said Unresolved resource request;

operative if said cache key resource identifier is the same as said unresolved resource request resource identifier, and if said verb recited in said selected resolution cache key is the same as said verb recited in said Unresolved resource request, determining if said Unresolved request scope is equivalent to a request scope recited in said selected resolution cache key;

operative if said cache key resource identifier is the same as said unresolved resource request resource identifier, and if said verb recited in said selected resolution cache key is the same as said verb recited in said Unresolved resource request, and if said Unresolved request scope is equivalent to a request scope recited in said selected resolution cache key, determining that said selected resolution cache key matches said Unresolved resource request.

29. The article of manufacture of claim 28, wherein no resolution cache key matches said resource request, said computer readable program code further comprising a series of computer readable program steps to effect:
resolving said resource request;
selecting a representation cache key;
determining if said selected representation cache key matches said resolved resource request;
operative if said representation cache key matches said resolved resource request, determining using an expiry determinant encoded in a representation cache entry associated with said selected representation cache key if a resource representation encoded in said representation cache entry associated with said selected representation cache key has expired;
operative if said resource representation encoded in said representation cache entry associated with said selected representation cache key has not expired, returning to said kernel function said resource representation encoded in said representation cache entry associated with said selected representation cache key.

30. The article of manufacture of claim 29, wherein said computer readable program code to determine if said selected representation cache key matches said resolved resource request comprises a series of computer readable program steps to effect:

determining if said cache key resource identifier is the same as a resolved resource request resource identifier recited in said resolved resource request, and if a verb recited in said selected representation cache key is the same as a verb recited in said resolved resource request;

operative if said cache key resource identifier is the same as said resolved resource request resource identifier, and if said verb recited in said selected representation cache key is the same as said verb recited in said resolved resource request, determining if said computed request scope is equivalent to a resolved request scope recited in said selected representation cache key;

operative if said cache key resource identifier is the same as said resolved resource request resource identifier, and if said verb recited in said selected representation cache key is the same as said verb recited in said resolved resource request, and if said computed request scope is equivalent to a resolved request scope recited in said selected representation cache key, determining that said selected representation cache key matches said resolved resource request.

31. The article of manufacture of claim 23, said computer readable program code further comprising a series of computer readable program steps to effect:
   maintaining a list comprising a plurality of contexts in which resolution of said resource request has been attempted;
       forming an immediate request scope comprising said list;
       computing a resolution high water mark comprising the difference between a number of contexts recited in the immediate request scope and a number of contexts recited in said Unresolved resource request.

32. The article of manufacture of claim 31, said computer readable program code further comprising a series of computer readable program steps to effect:
   maintaining a plurality of lists, wherein each list comprises a plurality of contexts in which resolution of said resource request has been attempted by a different sub-request;
   forming for each subrequest an intermediate request scope;
   computing for each subrequest an Unresolved high water mark comprising the difference between a number of contexts recited in an immediate request scope associated with that subrequest and a number of contexts recited in said Unresolved resource request;
   determining if an Unresolved high water mark is less than the resolution high water mark; operative if an Unresolved high water mark is less than the resolution high water mark, setting said resolution high water mark equal to said Unresolved high water mark having a value less than said resolution high water mark.

33. The article of manufacture of claim 31, wherein said resource request comprises a (N)-dimensional request scope, wherein (N) is greater than 1, said computer readable program code further comprising a series of computer readable program steps to effect forming a (N−1) dimensional resolution high water mark.

34. The article of manufacture of claim 31, said computer readable program code further comprising a series of computer readable program steps to effect generating and returning a resolution error message if resolution of said resource request is unsuccessful.

35. The article of manufacture of claim 31, said computer readable program code further comprising a series of computer readable program steps to effect:
   configuring a resolution cache;
       operative if said resource request is resolved, storing a resolution response in said resolution cache;
       generating a resolution cache key using said resolution response, resolution high water mark, and Unresolved resource request;
       saving said resolution cache key in said resolution cache.

36. The article of manufacture of claim 35, said computer readable program code further comprising a series of computer readable program steps to effect:
   computing a request scope transform;
       storing said request scope transform in said resolution cache.

37. The article of manufacture of claim 23, said computer readable program code further comprising a series of computer readable program steps to effect:
   returning to a kernel function a resource representation by said endpoint;
   determining a processing time for said endpoint to generate said resource representation; generating a total cost comprising said endpoint processing time in combination with the total processing times for all sub-requests generating unique resource representations;
   generating response metadata comprising said total cost.

38. The article of manufacture of claim 37, said computer readable program code further comprising a series of computer readable program steps to effect:
   assigning by said endpoint an expiry determinant for said returned resource representation;
   adding said expiry determinant to said response metadata.

39. The article of manufacture of claim 38, wherein said expiry determinant is selected from the group consisting of always-expired, never expired, timed expiry, dependent expiry, minimum timed dependent expiry, maximum timed dependent expiry and endpoint-function.

40. The article of manufacture of claim 38, wherein said cache determinant of said returned resource representation incorporates a cache determinant for each dependent resource utilized in determining said returned resource representation.

41. The article of manufacture of claim 38, said computer readable program code further comprising a series of computer readable program steps to effect generating by said kernel function a response to said requesting algorithm, wherein said response comprises said resource representation and said response metadata.

42. The article of manufacture of claim 38, said computer readable program code further comprising a series of computer readable program steps to effect:
   generating a representation cache entry comprising said resource representation and said response metadata;
   saving said representation cache entry in said representation cache.

43. The article of manufacture of claim 38, said computer readable program code further comprising a series of computer readable program steps to effect:
   computing an Unresolved representation cache key comprising a resource identifier recited in said resource request, a verb recited in said resource request, said Unresolved request scope, a requested representation type, a response representation type, and a depth comprising a difference between a number of contexts recited in said Unresolved context scope and an Unresolved high water mark;
   saving said Unresolved representation cache key in said representation cache;
   associating said Unresolved representation cache key with said representation cache entry.

44. The article of manufacture of claim 38, said computer readable program code further comprising a series of computer readable program steps to effect:
   computing an resolved representation cache key comprising a resource identifier recited in said resource request, a verb recited in said resource request, a resolved request scope, a requested representation type, a response representation type, and a depth comprising a difference between a number of contexts recited in said Unresolved context scope and an Unresolved high water mark;
   saving said resolved representation cache key in said representation cache;

associating said resolved representation cache key with said representation cache entry.

45. A computer program product encoded in a non-transitory computer readable medium and useable with a programmable processor to generate and save a resource representation, the computer program product comprising:

computer readable program code which causes said programmable processor to receive from a requesting algorithm an Unresolved resource request, wherein said Unresolved resource request is associated with a first context, wherein said first context comprises a first address space, and wherein said Unresolved resource request comprises an Unresolved request scope comprising at least said first context;

computer readable program code which causes said programmable processor to resolve said Unresolved resource request to an endpoint, wherein said endpoint is associated with a second context, wherein said second context comprises a second address space;

computer readable program code which causes said programmable processor to evaluate said resolved resource request by said endpoint to generate said resource representation;

computer readable program code which causes said programmable processor to generate and save in a cache at least one Unresolved request scope key;

computer readable program code which causes said programmable processor to generate and save in said cache a resolved request scope key;

computer readable program code which causes said programmable processor to generate and save in said cache a cache entry comprising said resource representation;

computer readable program code which causes said programmable processor to associate said cache entry with said resolved request scope key and with said at least one Unresolved request scope key using a mapping function encoded in said cache;

wherein said Unresolved resource request comprises a resource identifier and a verb, and wherein said computer readable program code to resolve said resource request to an endpoint comprises:

computer readable program code which causes said programmable processor to configure a representation cache comprising one or more representation cache keys, and one or more representation cache entries, wherein each representation cache key comprises a resource identifier, a verb, and a request scope, and wherein each representation cache entry comprises a resource representation and response metadata comprising an expiry determinant;

computer readable program code which causes said programmable processor to select a representation cache key;

computer readable program code which causes said programmable processor to determine if said selected representation cache key matches said Unresolved resource request;

computer readable program code which, if said representation cache key matches said Unresolved resource request, causes said programmable processor to determine using an expiry determinant encoded in a representation cache entry associated with said selected representation cache key if a resource representation encoded in said representation cache entry associated with said selected representation cache key has expired;

computer readable program code which, if said resource representation encoded in said representation cache entry associated with said selected representation cache key has not expired, causes said programmable processor to return to a kernel function said resource representation encoded in said representation cache entry associated with said selected representation cache key.

46. The computer program product of claim 45, wherein said first context and said second context are the same.

47. The computer program product of claim 45, wherein said first context and said second context differ.

48. The computer program product of claim 45, wherein each representation cache key comprises a resource identifier, a verb, and a request scope, and wherein said computer readable program code to determine if said representation cache key matches said Unresolved resource request comprises:

computer readable program code which causes said programmable processor to determine if a cache key resource identifier recited in said selected representation cache key is the same as an unresolved resource request resource identifier recited in said Unresolved resource request, and if a verb recited in said selected representation cache key is the same as a verb recited in said Unresolved resource request;

computer readable program code which, said cache key resource identifier is the same as said unresolved resource request resource identifier, and if said verb recited in said selected representation cache key is the same as said verb recited in said Unresolved resource request, causes said programmable processor to determine if said Unresolved request scope is equivalent to a request scope recited in said selected representation cache key;

computer readable program code which, if said cache key resource identifier is the same as said unresolved resource request resource identifier, and if said verb recited in said selected representation cache key is the same as said verb recited in said Unresolved resource request, and if said Unresolved request scope is equivalent to a request scope recited in said selected representation cache key, causes said programmable processor to determine that said selected representation cache key matches said Unresolved resource request.

49. The computer program product of claim 45, wherein no representation cache key matches said Unresolved resource request, further comprising:

computer readable program code which causes said programmable processor to configure a resolution cache comprising one or more resolution cache keys;

computer readable program code which causes said programmable processor to select a resolution cache key;

computer readable program code which causes said programmable processor to determine if said resolution cache key matches said Unresolved resource request;

computer readable program code which, if said resolution cache key matches said Unresolved resource request, causes said programmable processor to:

transform said Unresolved request scope into a computed request scope;

transform said Unresolved resource request into a resolved resource request comprising said computed request scope.

50. The computer program product of claim 49, wherein each resolution cache key comprises a resource identifier, a verb, and a resolved request scope, and wherein said computer readable program code to determine if said resolution cache key matches said resource request comprises:

computer readable program code which causes said programmable processor to determine if said cache key resource identifier is the same as said unresolved resource request resource identifier, and if a verb recited in said selected resolution cache key is the same as a verb recited in said Unresolved resource request;

computer readable program code which, if said cache key resource identifier is the same as said unresolved resource request resource identifier, and if said verb recited in said selected resolution cache key is the same as said verb recited in said Unresolved resource request, causes said programmable processor to determine if said Unresolved request scope is equivalent to a request scope recited in said selected resolution cache key;

computer readable program code which, if said cache key resource identifier is the same as said unresolved resource request resource identifier, and if said verb recited in said selected resolution cache key is the same as said verb recited in said Unresolved resource request, and if said Unresolved request scope is equivalent to a request scope recited in said selected resolution cache key, causes said programmable processor to determine that said selected resolution cache key matches said Unresolved resource request.

51. The computer program product of claim 50, wherein no resolution cache key matches said resource request, further comprising:

computer readable program code which causes said programmable processor to resolve said resource request;

computer readable program code which causes said programmable processor to select a representation cache key, computer readable program code which causes said programmable processor to determine if said selected representation cache key matches said resolved resource request;

computer readable program code which, if said representation cache key matches said resolved resource request, causes said programmable processor to determine using an expiry determinant encoded in a representation cache entry associated with said selected representation cache key if a resource representation encoded in said representation cache entry associated with said selected representation cache key has expired;

computer readable program code which, if said resource representation encoded in said representation cache entry associated with said selected representation cache key has not expired, causes said programmable processor to return to said kernel function said resource representation encoded in said representation cache entry associated with said selected representation cache key.

52. The computer program product of claim 51, wherein said computer readable program code to determine if said selected representation cache key matches said resolved resource request comprises:

computer readable program code which causes said programmable processor to determine if said cache key resource identifier is the same as a resolved resource request resource identifier recited in said resolved resource request, and if a verb recited in said selected representation cache key is the same as a verb recited in said resolved resource request;

computer readable program code which, if said cache key resource identifier is the same as said resolved resource request resource identifier, and if said verb recited in said selected representation cache key is the same as said verb recited in said resolved resource request, causes said programmable processor to determine if said computed request scope is equivalent to a resolved request scope recited in said selected representation cache key;

computer readable program code which, if said cache key resource identifier is the same as said resolved resource request resource identifier, and if said verb recited in said selected representation cache key is the same as said verb recited in said resolved resource request, and if said computed request scope is equivalent to a resolved request scope recited in said selected representation cache key, causes said programmable processor to determine that said selected representation cache key matches said resolved resource request.

53. The computer program product of claim 45, further comprising:

computer readable program code which causes said programmable processor to maintain a list comprising a plurality of contexts in which resolution of said resource request has been attempted;

computer readable program code which causes said programmable processor to form an immediate request scope comprising said list;

computer readable program code which causes said programmable processor to compute a resolution high water mark comprising the difference between a number of contexts recited in the immediate request scope and a number of contexts recited in said Unresolved resource request.

54. The computer program product of claim 53, further comprising:

computer readable program code which causes said programmable processor to maintain a plurality of lists, wherein each list comprises a plurality of contexts in which resolution of said resource request has been attempted by a different subrequest;

computer readable program code which causes said programmable processor to form for each subrequest an intermediate request scope;

computer readable program code which causes said programmable processor to compute for each subrequest an Unresolved high water mark comprising the difference between a number of contexts recited in an immediate request scope associated with that subrequest and a number of contexts recited in said Unresolved resource request;

computer readable program code which causes said programmable processor to determine if an Unresolved high water mark is less than the resolution high water mark; computer readable program code which, if an Unresolved high water mark is less than the resolution high water mark, causes said programmable processor to set said resolution high water mark equal to said Unresolved high water mark having a value less than said resolution high water mark.

55. The computer program product of claim 53, wherein said resource request comprises a (N)-dimensional request scope, wherein (N) is greater than 1, further comprising computer readable program code which causes said programmable processor to form a (N−1) dimensional resolution high water mark.

56. The computer program product of claim 53, further comprising computer readable program code which causes said programmable processor to generate and return a resolution error message if resolution of said resource request is unsuccessful.

57. The computer program product of claim 53, further comprising:
- computer readable program code which causes said programmable processor to configure a resolution cache;
- computer readable program code which, if said resource request is resolved, causes said programmable processor to store a resolution response in said resolution cache;
- computer readable program code which causes said programmable processor to generate a resolution cache key using said resolution response, resolution high water mark, and Unresolved resource request;
- computer readable program code which causes said programmable processor to save said resolution cache key in said resolution cache.

58. The computer program product of claim 57, further comprising:
- computer readable program code which causes said programmable processor to compute a request scope transform;
- computer readable program code which causes said programmable processor to store said request scope transform in said resolution cache.

59. The computer program product of claim 45, further comprising:
- computer readable program code which causes said programmable processor to return to a kernel function a resource representation by said endpoint;
- computer readable program code which causes said programmable processor to determine a processing time for said endpoint to generate said resource representation;
- computer readable program code which causes said programmable processor to generate a total cost comprising said endpoint processing time in combination with the total processing times for all sub-requests generating unique resource representations;
- computer readable program code which causes said programmable processor to generate response metadata comprising said total cost.

60. The computer program product of claim 59, further comprising:
- computer readable program code which causes said endpoint to assign an expiry determinant for said returned resource representation;
  - computer readable program code which causes said programmable processor to add said expiry determinant to said response metadata.

61. The computer program product of claim 60, wherein said expiry determinant is selected from the group consisting of always-expired, never expired, timed expiry, dependent expiry, minimum timed dependent expiry, maximum timed dependent expiry and endpoint-function.

62. The computer program product of claim 60, wherein said cache determinant of said returned resource representation incorporates a cache determinant for each dependent resource utilized in determining said returned resource representation.

63. The computer program product of claim 60, further comprising computer readable program code to generate by said kernel function a response to said requesting algorithm, wherein said response comprises said resource representation and said response metadata.

64. The computer program product of claim 60, further comprising:
- computer readable program code which causes said programmable processor to generate a representation cache entry comprising said resource representation and said response metadata; computer readable program code which causes said programmable processor to save said representation cache entry in said representation cache.

65. The computer program product of claim 60, further comprising:
- computer readable program code which causes said programmable processor to compute an Unresolved representation cache key comprising a resource identifier recited in said resource request, a verb recited in said resource request, said Unresolved request scope, a requested representation type, a response representation type, and a depth comprising a difference between a number of contexts recited in said Unresolved context scope and an Unresolved high water mark;
  - computer readable program code which causes said programmable processor to save said Unresolved representation cache key in said representation cache;
  - computer readable program code which causes said programmable processor to associate said Unresolved representation cache key with said representation cache entry.

66. The computer program product of claim 60, further comprising:
- computer readable program code which causes said programmable processor to compute an resolved representation cache key comprising a resource identifier recited in said resource request, a verb recited in said resource request, a resolved request scope, a requested representation type, a response representation type, and a depth comprising a difference between a number of contexts recited in said Unresolved context scope and an Unresolved high water mark;
- computer readable program code which causes said programmable processor to save said resolved representation cache key in said representation cache;
- computer readable program code which causes said programmable processor to associate said resolved representation cache key with said representation cache entry.

* * * * *